United States Patent [19]

Herman

[11] 4,266,660

[45] May 12, 1981

[54] ACCUMULATING-TYPE POWERED ROLLER CONVEYOR

[75] Inventor: Donald G. Herman, Indianapolis, Ind.

[73] Assignee: Smock Material Handling Company, Inc., Indianapolis, Ind.

[21] Appl. No.: 63,045

[22] Filed: Aug. 2, 1979

[51] Int. Cl.³ .............................................. B65G 13/06
[52] U.S. Cl. ................................ 198/781; 29/116 R; 29/130; 198/791; 252/12
[58] Field of Search ............... 198/780, 781, 787, 789, 198/790, 791, 624, 459; 29/116 R, 130; 308/DIG. 8; 252/12, 29

[56] References Cited

U.S. PATENT DOCUMENTS

| 886,998 | 5/1908 | Love | 29/130 X |
|---|---|---|---|
| 3,327,837 | 6/1967 | Covell | 198/781 X |
| 3,563,721 | 2/1971 | Ritter | 198/781 X |
| 3,951,255 | 4/1976 | Shuttleworth et al. | 198/790 |

OTHER PUBLICATIONS

*Product Engineering*, Sep. 5, 1960, A DiSapio "Bonded Coatings Lubricate Metal Parts," pp. 48–53.

*Primary Examiner*—Robert B. Reeves
*Assistant Examiner*—Douglas D. Watts
*Attorney, Agent, or Firm*—Blanchard, Flynn, Thiel, Boutell & Tanis

[57] ABSTRACT

A powered roller conveyor wherein a plurality of conveyor rolls are formed as elongated sleeves and are freely rotatably supported on support shafts which are slightly undersized relative to the sleeves. At least some of the support shafts are rotatably driven. The sleeves and support shafts are provided with a special coating on the opposed surfaces thereof so that friction between these surfaces is greatly minimized, whereby a minimal drive force is transmitted from the driving shafts to the sleeves, which minimal driving force is sufficient to effectively convey the articles along the conveyor but results in only minimal pressure on the articles and between the articles when they are stopped and accumulate on the conveyor.

7 Claims, 8 Drawing Figures

ACCUMULATING-TYPE POWERED ROLLER CONVEYOR

FIELD OF THE INVENTION

This invention relates to an improved accumulating-type powered roller conveyor for accumulating heavy loads with minimal line or accumulation pressure.

BACKGROUND OF THE INVENTION

Accumulating-type powered roller conveyors are widely used in various manufacturing and transfer operations so as to permit goods to be transported to and between various locations, with the goods being handled on a "first in-first out" basis. One conventional type of such conveyor as utilized with small or lightweight goods (i.e., less than 50 pounds) permits the goods to accumulate one after the other at the output end of the conveyor, with the accumulated goods or articles automatically advancing to the discharge end when one or more articles are removed. The accumulated articles abut against one another and slip on the continuously driven conveyor rolls. This type of conveyor normally performs quite satisfactorily when dealing with articles of light weight since the driving force imposed on each article is hence of small magnitude, so that the line pressure which exists between adjacent articles and which accumulates along the row of accumulated articles thus remains rather small.

However, when dealing with heavy articles, particularly articles in excess of 500 or more pounds, such as engine blocks, then the driving force applied to each article is of a much greater magnitude, and hence the accumulated line pressure which exists on and is exerted through the row of accumulated articles thus becomes of large magnitude. This is undesirable since it often results in an excessive force being imposed on the stop located at the end of the conveyor, and hence severely restricts the number of articles which can be accumulated within a single row. For this reason, most accumulating-type powered roller conveyors when designed for use with heavier articles have necessarily involved the well-known and extensively utilized concept of "zoning". Such a "zoned" conveyor is divided longitudinally into a plurality of zones each having a preselected number of drive rolls associated therewith, and a suitable retractable stop is located at the discharge end of each zone. A rather complex system of controls, involving switches and the like, is provided for interconnecting the various zones so that articles will be permitted to advance from one zone to the next only when the sensors indicate an opening in such zone. In this manner, the number of articles within each zone and hence the maximum accumulated line pressure, can be limited to tolerable levels. These zoned conveyors, however, are necessarily complex both structurally and operationally due to the switches and related control elements, thereby making the conveyor relatively expensive to construct and install, and also increasing the required maintenance.

The present invention accordingly relates to an improved powered roller conveyor which successfully handles and accumulates heavy articles while resulting in the development of extremely small line pressure per article during accumulation, whereby substantially large numbers of such heavy articles can be successfully accumulated without developing excessive line pressure or force. This thus enables the conveyor of the present invention to be successfully utilized in situations wherein more complex zone-type conveyors were previously required. The improved conveyor of this invention is also adaptable for zoning, but permits substantial simplification of the overall conveyor in contrast to prior systems in that it does not require special gear ratios or drives for creating a gap between the articles when an article is being advanced from one zone to the next.

The improved roller conveyor of this invention also successfully handles and accumulates extremely heavy articles while permitting continuous and positive (i.e., nonslip) driving of the conveyor drive rollers. This conveyor is thus usable in situations wherein intermittent driving of the rollers was previously required, which intermittent driving required more complex drive arrangements employing clutches, controls and the like.

In the improved conveyor of this invention, a plurality of conveyor rolls are formed as elongated sleeves and are freely rotatably supported on support shafts which are slightly undersized relative to the sleeves. While all of the support shafts can be rotatably driven, nevertheless the preferred conveyor of this invention drives only selected support shafts at preselected intervals longitudinally along the conveyor. The sleeves and support shafts are provided with a special coating on the opposed surfaces thereof so that friction between these surfaces is greatly minimized, whereby a minimal drive force is hence transmitted from the driving shafts to the sleeves, which minimal driving force is sufficient to effectively convey the articles along the conveyor but which results in only minimal pressure on the articles and between the articles when they are stopped for accumulation purposes. Substantial numbers of heavy articles can thus be successfully accumulated while resulting in minimal accumulated line pressure.

While several accumulating-type powered roller conveyors are previously known which employ sleeves or wheels rotatably supported on driving shafts, nevertheless all of these known conveyors have failed to significantly minimize the line pressure on the accumulated articles, and hence have been incapable of accumulating heavy articles. For example, U.S. Pat. No. 3,337,023, issued to Kohl et al, discloses a plurality of axially aligned wheels of a special configuration which are individually rotatably supported on each drive shaft. Further, the wheels on adjacent drive shafts are in rubbing interfitting engagement with one another. This conveyor is undesirable since it is designed primarily for use in handling very light and delicate articles. Further, the use of a plurality of axially adjacent rollers or wheels on each drive shaft makes the overall structure extremely complex, unsuitable for use with heavy articles, and creates an alignment problem in that variable slippage can result in undesired sideward twisting or displacement of the articles.

U.S. Pat. No. 3,951,255, issued to Shuttleworth, also discloses a powered roller conveyor similar to that of Kohl et al, in that Shuttleworth also employs a plurality of axially adjacent rollers rotatably supported on each drive shaft, whereby this conveyor thus possesses substantially the same disadvantages, and is incapable of operating with heavy loads.

One further conveyor designed specifically for handling glass sheets is shown in U.S. Pat. No. 3,563,721, issued to Ritter. The Ritter conveyor provides an elongated sleeve which is freely rotatably supported in surrounding relationship on each drive shaft to permit slippage therebetween when the conveyed glass sheet is stopped. While Ritter was striving to minimize the driving friction between the conveyor sleeve and the drive shaft, and hence minimize the accumulation pressure, nevertheless Ritter utilizes a metal sleeve in surrounding relationship to a metal drive shaft, and hence the degree of friction between these members and the amount of driving force transmitted to the sleeve is still greater than desired. Since Ritter is conveying rather light articles, namely glass sheets, his conveyor can be successfully utilized for its intended purpose, although it would be unacceptable and, in fact, impractical for use with heavy articles since it would still result in excessive line p ressure and hence would greatly restrict the number of articles which could be accumulated. Further, any attempt to use the Ritter conveyor with heavy articles (500 pounds or more) would create extremely large friction forces on the metal sleeve, resulting in excessive heat and wear on the sleeves, whereby the sleeves would rapidly wear completely through the thin walls thereof.

Accordingly, it is an object of the present invention to provide an improved conveyor of a type similar to that illustrated in Ritter, but wherein the driving frictional forces between the drive shaft and the article support sleeve is greatly minimized in contrast to that possessed by the Ritter conveyor, so that the conveyor of this invention will permit the development of minimum line pressure between the accumulated articles, whereby heavy articles can be successfully conveyed and successfully accumulated in substantial quantities.

Another object is to provide an improved conveyor of this general type, wherein the opposed surfaces of the sleeve and drive shaft, which surfaces rollingly engage one another, are provided with a specialized coating which enables the friction to be greatly minimized to thereby effectively minimize the line pressure between accumulated articles.

A further object of this invention is to provide an improved conveyor, as aforesaid, which is greatly simplified both structurally and operationally, which can successfully convey and accumulate extremely heavy articles, which can successfully accumulate large numbers of such heavy articles without excessive line pressure being developed, and which permits the use of a nonzoned accumulating conveyor in many use situations which previously required the use of a multiple-zone powered conveyor.

Still another object is to provide an improved conveyor, as aforesaid, which permits continuous rotation of the drive rollers even though handling heavy loads, and which permits positive driving of these rollers.

Still a further object is to provide an improved conveyor, as aforesaid, which is also highly adaptable for use as a zoned conveyor, by permitting zoning to be achieved in a simplified manner and without the use of special drive devices and the like for creating a gap between articles when they are transferred between adjacent zones.

SUMMARY OF THE INVENTION

In the improved conveyor of this invention, the conveyor rolls are formed as elongated sleeves, with one such sleeve being rotatably and surroundingly supported on a support shaft. Each sleeve is of slightly larger diameter than the support shaft so as to be eccentrically supported thereon, each sleeve thus having the inner surface thereof frictionally engaged with the upper outer surface of the support shaft along a substantially line contact. The inner annular surface of the sleeve and the outer annular surface of the shaft are provided with a nickel/manganese phosphate coating, and are also these two surfaces is maintained at an extremely small magnitude. In this manner, the driving force transmitted from the support shaft to the article-supporting the sleeve is greatly minimized, whereupon the accumulation of heavy articles on the conveyor occurs due to stoppage of the articles and of the sleeves, even though the drive shafts are continuously and positively driven and thus slip within the sleeves, resulting in imposition of minimal driving force on the sleeves and thus imposition of minimal line pressure between and on the accumulated articles.

In addition, preferably only selected support shafts are rotatably driven, such as every second or third support shaft, so that the driving force and hence the line pressure is still further minimized. The conveyor can also be provided with longitudinally spaced zones, the individual roller units within the zones having coated sleeves and support shafts, with several roller units being provided between adjacent zones and having noncoated surfaces between the sleeves and support shafts so that a greater friction and hence driving force exists within these latter roller units to thereby effectively drive the frontmost article and thus create a gap between adjacent articles when the individual articles are driven from one zone to the next.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the conveyor and designated parts thereof. The word "forwardly" will refer to the normal movement direction of articles along the conveyor, which direction occurs upwardly in FIG. 1 and leftwardly in FIG. 6. Said terminology includes the words specifically mentioned, derivatives thereof, and words of similar import.

DETAILED DESCRIPTION

Figure 1:
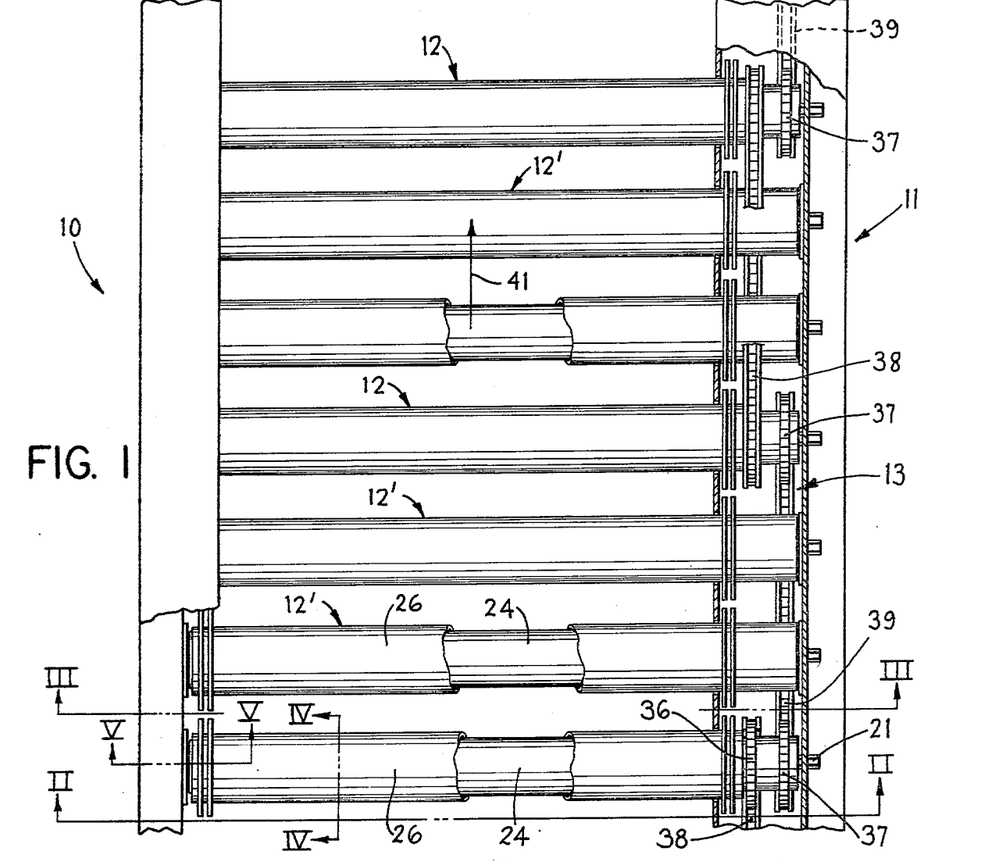
FIG. 1 is a fragmentary top view, partially in cross section, of an improved accumulating-type powered roller conveyor according to the present invention.

FIG. 1 illustrates an accumulation-type powered roller conveyor 10 according to the present invention, which conveyor includes a frame 11 having a plurality of roller units 12 supported thereon, which units are driven by a drive system 13.

The frame 11 includes opposed side rails 16 and 17 which extend longitudinally of the conveyor and are respectively provided with cover plates 18 and 19 for at least partially enclosing the ends of the roller units and the drive system.

Figure 2:
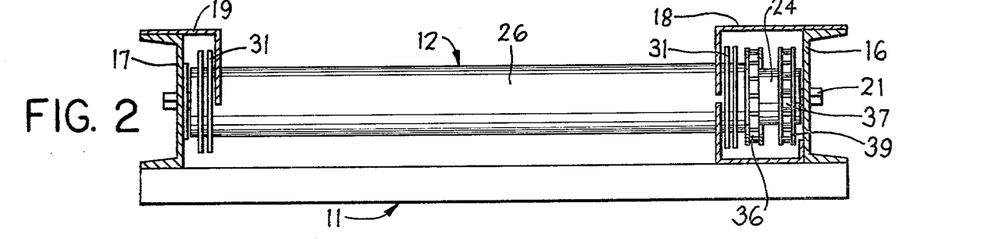
FIGS. 2 and 3 are sectional elevational views taken along lines II—II and III—III, respectively, in FIG. 1.
Figure 4:
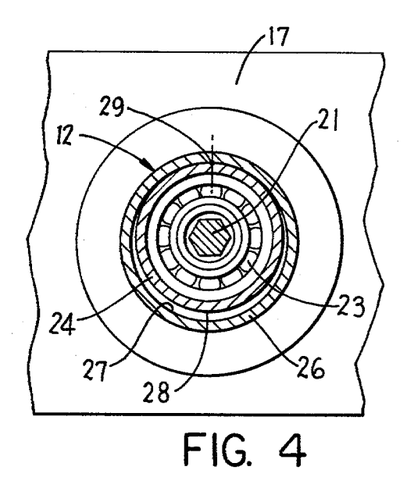
FIGS. 4 and 5 are enlarged sectional views taken along lines IV—IV and V—V, respectively, in FIG. 1.
Figure 5:
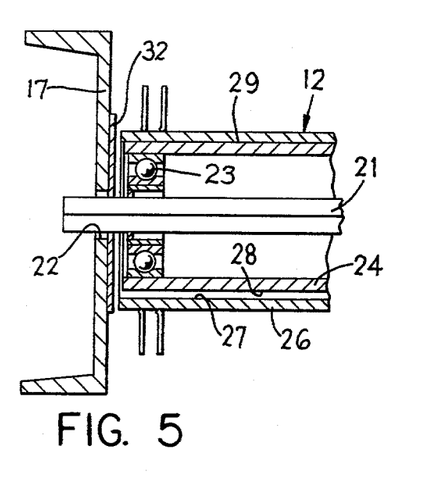

The roller unit 12, as illustrated in FIGS. 2, 4 and 5, includes an elongated stationary support axle 21 which extends perpendicularly between the side rails 16 and 17, the ends of said axle 21 projecting through openings 22 in the side rails. A pair of conventional roller bearings 23 are located adjacent the opposite ends of the axle, and the outer races of these bearings 23 are suitable secured, as by a press fit, within the ends of an elongated tubular support shaft 24. This support shaft 24 extends across the full exposed width of the conveyor and in turn is surrounded by an elongated conveyor roll or sleeve 26.

The conveyor sleeve 26, as illustrated in FIGS. 4 and 5, has an inner diameter which is at least slightly greater than the outer diameter of the support shaft 24 so that the conveyor sleeve 26 is thus maintained in an eccentric relationship relative to the support shaft 24. In this regard, the conveyor sleeve 26 has an inner annular surface 27 which is adapted to rollingly and slippingly engage the outer annular surface 28 of the support shaft 24. The conveyor sleeve 26 is freely supported solely by the support shaft 24 which, due to the difference in diameters, results in the conveyor sleeve 26 being eccentrically positioned relative to the support shaft 24. The inner annular surface 27 thus effectively engages the outer annular surface 28 along a narrow contact area 29 which extends axially along the upper surface of the shaft 24 and effectively approaches a line.

Each end of the conveyor sleeve 26 preferably has a pair of sheet metal slinger plates 31 press fit thereon and projecting radially outwardly thereof, which plates act as diverters for oil, chips and other contaminating materials to prevent their coming into contact with the bearings 23. A hardened wear plate 32 is disposed adjacent each end of the roller unit, which wear plate is nonrotatably held relative to the adjacent side rail to prevent the ends of the roller unit from rotatably rubbing against and hence excessively wearing the side rail.

Figure 3:
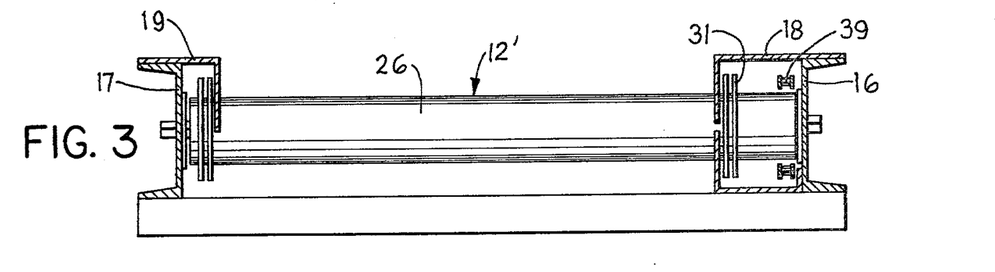

To cause rotational driving of the roller units 12, the drive system 13 includes a plurality of power transmitting devices which are positively drivingly connected to at least selected roller units. As illustrated in FIGS. 1-3, one end of the support shaft 24 as associated with each roller unit 12 has a pair of sprockets 36 and 37 fixedly and nonrotatably secured thereto in side-by-side relationship. A suitable drive chain 38 is engaged with and extends between the sprockets 36 of one adjacent pair of roller units 12, and a further drive chain 39 is engaged with the sprockets 37 on the next adjacent pair of roller units 12 to thereby permit transmission of driving torque along the conveyor to effectively positively rotatably drive the support shaft 24 as associated with each roller unit 12. This drive system 13, in addition to causing positive nonslip driving of the shafts 24, is free of clutches and the like to permit continuous rotation of the shafts 24 associated with all of the powered roller units 12.

If necessary, each adjacent roller unit can be rotatably driven, in which case each roller unit would be formed identical to the unit 12 and would have a pair of said sprockets 36 and 37 associated therewith. However, according to the present invention, it is preferred to drive only selected roller units located at predetermined intervals along the conveyor. For example, as illustrated in FIG. 1, the powered roller units 12 comprise each third roller unit along the conveyor, and a further pair of nonpowered roller units 12' are located between each pair of powered roller units 12. These nonpowered roller units 12' are identical to the powered roller units 12 except that they are not provided with the sprockets 36 and 37 thereon. By suitably driving only selected roller units located at preselected intervals along the conveyor, the driving torque and hence the line pressure imposed on the accumulated articles supported on the conveyor is still further minimized.

In operation of the conveyor 10, articles are conveyed therealong in a conventional manner, such as in the direction indicated by arrow 41 in FIG. 1. However, when the leading article engages a stop, such as at a work station or at the discharge end of the conveyor, then further advancement of this article is prevented, even though the drive shafts 24 continue to be rotatably driven. This thus results in slippage occurring substantially at the contact line 29 between the conveyor sleeve 26 and the drive shaft 24, whereby the conveyor sleeve 26 remains stationary along with the article. A driving force is, nevertheless, still imposed on the sleeve 26, which driving force is a function of the friction which exists between the surfaces 27 and 28. This driving force, as imposed on the stationary sleeve 26, is effectively transmitted to the article, which in turn transmits this force to the stop. This driving force, as imposed on the article and transmitted to the stop, is referred to as the accumulation line pressure. As several articles accumulate one against the other along the conveyor, causing stoppage of the related conveyor sleeves 26, the drive forces imposed on the individual articles are cumulative such that the line pressure imposed on the articles, and particularly as imposed on the endmost articles which in turn bear against the stop, can thus be of sufficient magnitude as to damage either the stop or the articles themselves. Thus, the number of articles which can be accumulated is severely limited, particularly when dealing with heavy articles since the driving force and hence the line pressure which develops per article is directly related to the weight of the individual article.

Accordingly, to greatly minimize the driving force imposed on each article when accumulation occurs, particularly when dealing with heavy articles, the present invention provides the opposed annular surfaces 27 and 28 of the roller unit with a special coating which substantially minimizes friction, and hence also minimizes the driving torque and thus the line pressure. The surfaces 27 and 28 are preferably provided with a manganese/nickel phosphate coating, one such coating being applied by means of a fluidized bed and known as an "Aerocote" coating (Aerocote Corporation, Houston, Texas). The manganese/nickel phosphate coating has been discovered to provide an outstanding surface for sliding or rubbing metal parts, in that it substantially reduces friction, wear and galling, and additionally increases the lubricity of the treated surfaces. The coated surfaces effectively become corrosion resistant and also have a high degree of surface uniformity since the coating becomes integrally bonded to the metal without effecting the dimensions of the coated parts inasmuch as the coating is formed in place at the metal surface incorporating metal ions dissolved from the part or surface being coated.

Figure 7:
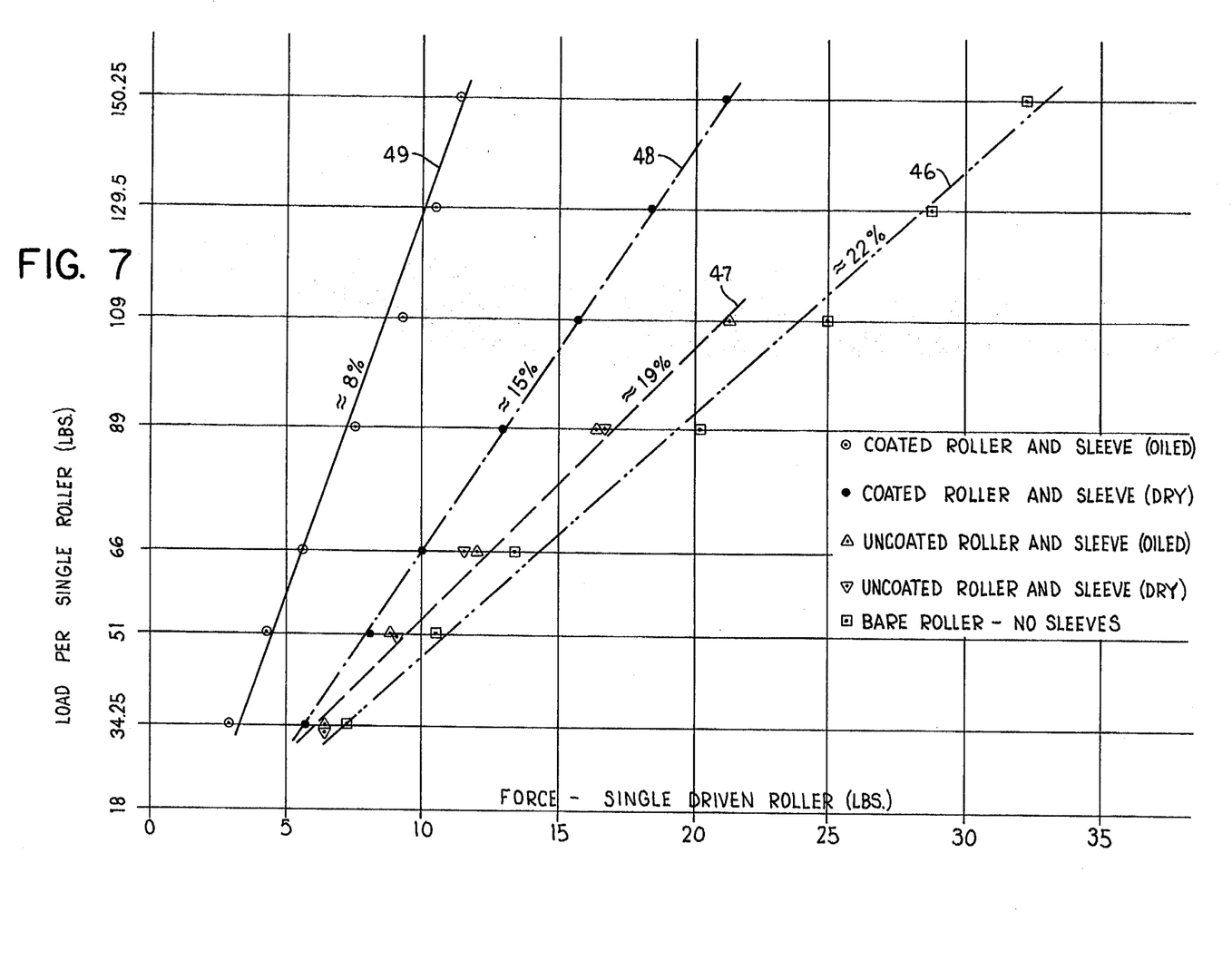
FIG. 7 is a chart illustrating the substantial reduction in friction, and hence line pressure and drive force, achieved with the improved roller unit of this invention.

FIG. 7 illustrates therein the significantly improved and unexpected results achieved by providing the surfaces 27 and 28 of the roller unit with the aforesaid manganese/nickel phosphate coating. The test data appearing in FIG. 7 discloses, along the ordinate, the load or article weight per roller, whereas the abscissa relates to the driving force imposed on the single stopped driven conveyor sleeve 26 by means of the rotating drive shaft 24, the forces along the abscissa thus being the line pressure imposed on the article per engagement with each powered roller unit. The dash-double-dot line 46 indicates the line pressure or drive force which results when the articles engage bare rollers without sleeves, so that slippage occurs directly between the articles and the rollers. The dash line 47 indicates the line pressure which results when a roller unit 12 as illustrated in FIG. 5 is utilized, with the opposed surfaces 27 and 28 being either dry or lubricated with oil. While this arrangement does result in some reduction in the driving frictional torque from the drive shaft 24 to the conveyor sleeve 26, nevertheless the reduction is still rather small as evidenced by the close proximity of the lines 46 and 47, so that substantial line pressure still exists along and between the accumulated articles. The fact that the opposed surfaces were lubricated, namely oiled, while at the same time the line pressure was not significantly or greatly reduced from that shown by the test data embodied by line 46, thus indicates that a conveyor of this type possessing the arrangement represented by lines 46 or 47 would be totally unsuitable for use in conveying and accumulating heavy articles. Further, the use of oil on the surfaces 27–28 does not appear to have any significant effect when compared with dry or nonlubricated surfaces.

On the contrary, when the surfaces 27 and 28 were provided with the manganese/nickel phosphate coating as in the present invention, then the friction and hence the driving force imposed on the stopped conveyor rolls 26, and hence the line pressure imposed on each accumulated article, was substantially reduced as evidenced by the dash-dot line 48. Further, when these coated surfaces 27 and 28 were additionally oiled, then the friction and hence the driving force imposed on the stopped conveyor sleeves, and hence the line pressure, was even more significantly reduced as evidenced by the solid line 49.

Accordingly, when using the coated roller units 12 according to the present invention, in contrast to the uncoated roller units as previously proposed, the coated roller units were discovered to provide a substantial reduction in the friction and hence a substantial reduction in the line pressure so that the handling and accumulation of substantially heavier articles with a roller conveyor of this type is now clearly possible, as is believed apparent from comparison of lines 47 and 48. Further, when the improved coated roller unit of this invention is additionally provided with lubricant, then the lubricant results in an unexpected significantly large decrease in the friction and hence in the line pressure, as evidenced by line 49, so that the conveying and accumulation of a substantial quantity of heavy articles can thus be feasibly carried out with this type of powered roller conveyor while permitting both continuous and positive driving of the inner shafts 24.

Figure 6:
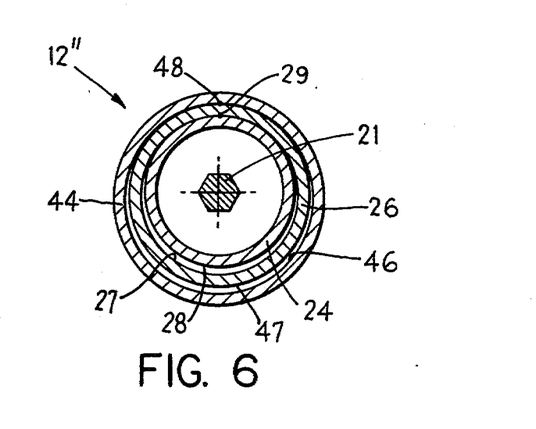
FIG. 6 is a cross-sectional view similar to FIG. 4 but illustrating a variation.

Referring to FIG. 6, there is illustrated a modified powered roller unit 12″ according to the present invention, which unit 12″ incorporates therein in its entirety the roller unit 12. This modified unit 12″ includes still a further elongated sleeve 44 which is larger than and surrounds the sleeve 26, being in frictional rolling and slipping engagement therewith. This outer sleeve 44 now functions as the conveyor roll and is of slightly larger diameter than the sleeve 26, so that sleeve 44 is thus eccentrically positioned relative to both the sleeve 26 and the tubular drive shaft 24. The inner annular surface 46 of outer sleeve 44 is in frictional rolling and slipping engagement with the outer annular surface 47 of the sleeve 26, the two sleeves being in frictional engagement substantially along the line contact 49.

The roller unit 12″ shown in FIG. 6 thus basically utilizes an additional intermediate eccentric and freely rotatable sleeve positioned between the drive shaft and the conveyor roller, so that two slippable friction points exist instead of one. This thus further minimizes the drive torque transmitted from the drive shaft to the conveyor roll, and hence to the article, when the conveyor roll is stopped under conditions of article accumulation, so that accumulated line pressure along the articles is still further minimized. This variation involving the additional intermediate sleeve is believed particularly suitable when conveying and accumulating extremely heavy articles. The opposed friction surfaces 46 and 47 are also preferably coated with said manganese/nickel phosphate, as are the opposed friction surfaces 27 and 28.

While the conveyor 10 as described above is highly desirable for permitting the powered conveying and accumulating of heavy articles without having to resort to zoning, this conveyor and particularly the improved roller unit thereof is also highly desirable for use in environments where plural longitudinally spaced accumulation zones are required. Such a zoned conveyor, incorporating therein the improvements of the present invention, is diagrammatically illustrated in FIG. 8.

Figure 8:
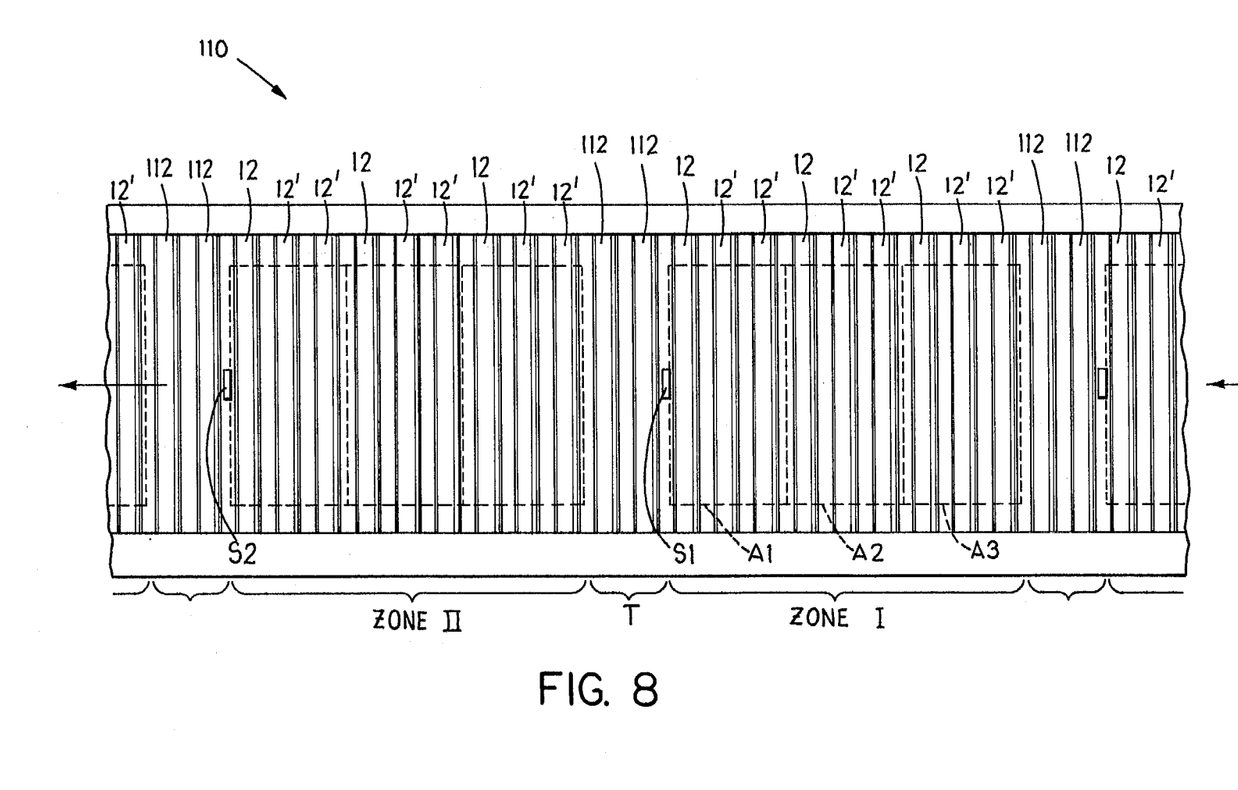
FIG. 8 is a fragmentary top view illustrating a variation wherein the conveyor is provided with zones.

FIG. 8 illustrates therein only a portion of a zoned accumulating-type powered roller conveyor 110 according to the present invention, the illustrated conveyor possessing two accumulation zones, designated as zone I and zone II, which zones have a transition region T therebetween. Each zone has, in the illustrated embodiment, nine roller units associated therewith, three of them being powered roller units 12 and the other six being nonpowered roller units 12′, although it will be apparent that all of the roller units could be powered, or alternately the spacing of the powered and nonpowered roller units could be varied as desired. For purposes of illustration, each zone has a maximum of three articles accumulated therein, such as the articles A1, A2 and A3. The frontmost article A1 in zone I is held by means of a conventional retractable stop S1, and a similar retractable stop S2 is associated with zone II. The structure and operation of these stops is conventional and well known in zoned conveyors, the stops being retractable either between the rollers or from beside or above the conveyor so as to impede the progress of articles along the conveyor in a conventional and well-known manner.

According to the improved conveyor 110 of this invention, the transition zone T between adjacent accumulation zones has one or more powered roller units 112 associated therewith, which powered roller unit 112 is identical to the powered roller unit 12 except that unit 112 does not have the manganese/nickel phosphate coating on the opposed friction surfaces 27 and 28, but rather these are merely bare noncoated metal surfaces which are in rolling and slipping frictional engagement with one another. This thus results in increased friction, and hence increased driving torque being transmitted from the drive roller 24 to the conveyor sleeve 26 of the roller unit 112, in contrast to the roller units 12. In all other respects, the units 12 and 112 are identical in that the drive shafts 24 thereof are driven at the same speed, such as by the drive system 13 employing a chain drive connected between adjacent roller units.

When the zoned conveyor 110 has the maximum number of articles stopped on the conveyor by the stop S2 within zone II, then stop S1 is activated to cause accumulation and stoppage of the articles within zone I, this zoning and accumulation occurring by means of conventional sensors, limit switches and the like, such zoning systems being well known and understood by those of ordinary skill in this art. However, when one of the articles within zone II is permitted to move forwardly of the conveyor, as due to lowering to stop S2, then an appropriate sensor within the zoning system also subsequently lowers the stop S1 so that at least the leadmost article A1 within zone I can move up into zone II. As is well understood by those familiar with this technology, however, it is necessary to create a gap or space between the articles A1 and A2, that is, the article A1 must be pulled away from the article A2, since otherwise it becomes impossible to reactivate the stop S1 in the event that it is necessary to hold the article A2 within zone I. To pull the article A1 away from the article A2, thereby "pulling a gap", conventional zoned conveyors have generally driven the rollers within the transition zone T at a higher speed. This makes the overall system more complex by requiring special gears, clutches or speed controls. This is not necessary with the conveyor 110 of this invention since the roller units 112 in the transition zone T have the drive shafts 24 thereof driven at the same speed as the powered roller units 12. However, due to the substantially greater friction within the units 112, in contrast to the units 12 which have the coated friction surfaces, the conveyor sleeve 26 of the unit 112 thus undergoes little slippage, and hence is rotating faster than the conveyor sleeves 26 associated with the units 12 due to the coated friction surfaces associated with these latter units. Thus, as the lead article A1 is moved from the powered roller unit 12 into engagement with the powered transition roller unit 112, the higher rotational speed and driving torque associated with the conveyor sleeve 26 of the unit 112 causes the article A1 to thus be pulled away from the article A2, whereby the desired gap or space between the articles is recreated so that the stop S1 can be activated for insertion between these articles to stop the article A2 if necessary.

As to the size or diameter of the shaft 24 and sleeve 26, they are normally in the range of between 2½ and 4 inches in diameter. Further, the inner diameter of conveyor sleeve 26 is preferably only slightly greater than the outer diameter of the shaft 24, these differences in diameter being normally in the range of 1/16 to ½ inch, and preferably no more than ¼ inch. While initially it was believed that the inner diameter of the sleeve 26 should be substantially greater than the outer diameter of the roller 24, with this difference in diameter being as great as possible, nevertheless experimental testing of the improved roller unit according to the present invention revealed just the opposite results, namely that the conveyor sleeve should be of larger diameter than the roller but only by the minimal amount necessary to insure a proper pointlike contact between the opposed friction surfaces solely along the upper surface of the drive shaft.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a powered roller conveyor for both transporting and accumulating heavy articles, said conveyor including a frame, a plurality of roller units supported on said frame for defining a transport path for said articles, said roller unit including an elongated metal support shaft and a single axially elongated sleevelike metal conveyor ring freely rotatably supported on said shaft in surrounding relationship thereto, said conveyor ring having an inside diameter which is slightly greater than the outer diameter of said shaft so that said ring is eccentrically supported on said shaft, said ring having an inner annular surface which is normally in rolling engagement with the outer annular surface of said shaft and is frictionally driven by and slidable upon said shaft, and drive means drivingly interconnected to the shafts associated with at least some of said roller units for rotatably driving said shafts to thereby effect frictional rotational driving of the respective conveyor rings, comprising the improvement wherein the inner annular surface of said ring and the outer annular surface of said shaft are coated with manganese/nickel phosphate which integrally bonds to the metal of the shaft and conveyor ring to substantially reduce the frictional driving force imposed on the conveyor ring, whereby stoppage of an article on said conveyor causes stoppage of the conveyor ring as permitted by slippage between the ring and its respective shaft while resulting in minimum drive force being transmitted to the stopped article, wherein the inner and outer surfaces, as coated with said manganese/nickel phosphate, are also provided with a coating of a flowable lubricant, wherein the drive means continuously and positively rotatably drives the shafts of the driven roller units in a nonslip manner through drive connection mechanisms which are free of clutches or other drive-disrupting devices, and wherein said drive means is drivingly connected to only selected roller units which are disposed at preselected and uniformly spaced intervals along the conveyor, each said pair of adjacent driven roller units being spaced apart by at least one intermediate roller unit which is not driven, said intermediate and driven roller units both being of substantially identical construction and employing a said conveyor ring eccentrically surrounding a said support shaft.

2. A conveyor according to claim 1, wherein the drive means includes chains drivingly connected between the shafts of adjacent driven roller units for causing continuous and positive rotation of said shafts.

3. A conveyor according to claim 1, wherein said frame includes a pair of elongated and substantially parallel side rails which are spaced a preselected distance apart, said roller units being individually disposed substantially horizontally and extending perpendicularly between said pair of side rails, said conveyor ring extending perpendicularly between and having the ends thereof disposed closely adjacent said side rails, and hardened wear plates fixedly positioned adjacent the side rails in close proximity to the adjacent ends of the conveyor ring, said conveyor ring also having an annular slinger plate fixed thereto adjacent each end thereof and projecting radially outwardly therefrom, and said frame including a cover plate connected to each side rail and projecting inwardly therefrom so as to at least partially cover and enclose the slinger plates associated with the adjacent ends of the conveyor ring.

4. A conveyor according to claim 1, wherein the inner diameter of the conveyor ring is between 1/16 and ½ inch larger than the outer diameter of the support shaft, and wherein the conveyor ring has an outer diameter approximately within the range of between 2 inches and 5 inches.

5. In a powered roller conveyor for both transporting and accumulating heavy articles, said conveyor including a frame, a plurality of roller units supported on said frame for defining a transport path for said articles, said roller unit including or elongated metal support shaft and an elongated sleevelike conveyor ring freely rotatably supported on said shaft in surrounding relationship thereto, said conveyor ring having an inside diameter which is at least slightly greater than the outer diameter of said metal shaft so that said ring is eccentrically supported on said shaft, said ring having an inner annular surface which is normally in rolling engagement with the outer annular surface of said shaft and is frictionally driven by and slidable upon said shaft, and drive means drivingly interconnected to the shafts associated with at least some of said roller units for rotatably driving said shafts to thereby effect frictional rotational driving of the respective conveyor rings, comprising the improvement wherein:

each said roller unit has only a single conveyor ring associated therewith, and said conveyor ring comprising an axially elongated thin-walled metal tube;

the inner annular surface of said metal ring and the outer annular surface of said metal shaft both being coated with a dry, substantially self-lubricating, wear-resistant, corrosion-resistant, low-friction coating which is substantially integrally bonded to the metal to substantially reduce the frictional driving force imposed on the conveyor ring;

said drive means having means drivingly connected to the shafts of the driven roller units, which last-mentioned means are free of clutches and other drive-disrupting devices, for continuously and positively driving the shafts of the driven roller units in a nonslip manner, whereby stoppage of an article on said conveyor causes stoppage of the conveyor ring as permitted by slippage between the ring and its respective shaft while resulting in minimum drive force being transmitted to the stopped article;

said frame including a pair of elongated and substantially parallel side rails which are spaced a preselected distance apart, said roller units being individually disposed substantially horizontally and extending perpendicularly between said pair of side rails, said conveyor ring extending perpendicularly between and having the ends thereof disposed closely adjacent said side rails; and hardened wear plates fixedly positioned adjacent the side rails in close proximity to the adjacent ends of the conveyor ring, each said roller unit including an elongated intermediate sleeve disposed radially between said conveyor ring and said shaft, said intermediate sleeve having an inner diameter slightly greater than the outer diameter of said shaft so as to be eccentrically positioned relative thereto, and said intermediate ring having an outer diameter slightly less than the inner diameter of said conveyor ring so as to be eccentrically positioned relative thereto, said intermediate sleeve being solely frictionally engaged with said shaft so as to be frictionally driven by and slidable upon said shaft, and said conveyor ring being solely frictionally engageable with said intermediate sleeve so as to be frictionally drivable and slidable upon said intermediate sleeve.

6. In an accumulating-type powered roller conveyor for transporting heavy articles along a path and for stationarily accumulating said articles at a selected location, said conveyor including:

frame means including a pair of elongated, spaced-apart side rails extending longitudinally of the conveyor;

a plurality of roller units supported on and extending perpendicularly between the side rails, the roller units being substantially uniformly spaced apart and defining a first zone for permitting the accumulation of said articles;

a second plurality of said roller units extending substantially perpendicularly between said side rails, said second plurality being spaced downstream from said first plurality and defining a second zone for also permitting accumulating of said articles;

stop means associated with each of said first and second zones adjacent the downstream ends thereof for selectively and individually permitting accumulation of articles within said zones; and drive means drivingly interconnected to at least some of the roller units associated with each said zone for rotatably driving same;

comprising the improvement wherein each of the powered roller units as associated with said zones includes an elongated rotatably driven drive shaft and an elongated sleevelike conveyor roll supported on said drive shaft in surrounding relationship thereto, said conveyor roll having an inner diameter which is larger than the outer diameter of said drive shaft so that the conveyor roll is eccentrically supported on the drive shaft and is solely frictionally engaged therewith so as to be both frictionally rotatably driven by and rotatable relative to said drive shaft; and an intermediate roller unit disposed intermediate said first and second zones for drivingly engaging the leading article within said first zone and conveying it downstream toward the second zone at an increased rate to thereby separate said leading article from the next trailing article;

said intermediate roller unit being substantially identical to the powered roller units in that it also includes a rotatably driven shaft having a sleevelike conveyor roll eccentrically and freely rotatably supported thereon for frictional driving engagement therewith, the drive shafts of said powered roller units and said intermediate roller unit all being driven at the same speed, and the opposed inner and outer frictional engaging surfaces of said intermediate unit being provided with a higher friction than the surfaces on said powered roller units so as to transfer greater driving torque to the conveyor sleeve of said intermediate roller unit whereby less slippage occurs and the leading article can then be pulled away from said next trailing article.

7. A conveyor according to claim 6, wherein the opposed inner and outer annular surfaces on the drive shaft and roll of the powered roller units are coated with manganese/nickel phosphate to provide minimum friction, the intermediate roller unit being free of said coating.

* * * * *

UNITED STATES PATENT AND TRADEMARK OFFICE
CERTIFICATE OF CORRECTION

PATENT NO. : 4,266,660
DATED : May 12, 1981
INVENTOR(S) : Donald G. Herman

It is certified that error appears in the above—identified patent and that said Letters Patent is hereby corrected as shown below:

Column 11, line 19, "or" should read -- an --.

Signed and Sealed this

Eighteenth Day of August 1981

[SEAL]

Attest:

GERALD J. MOSSINGHOFF

Attesting Officer     Commissioner of Patents and Trademarks